June 9, 1931.  V. I. CRUSER  1,809,025
ELECTRICAL DEVICE
Filed July 29, 1929
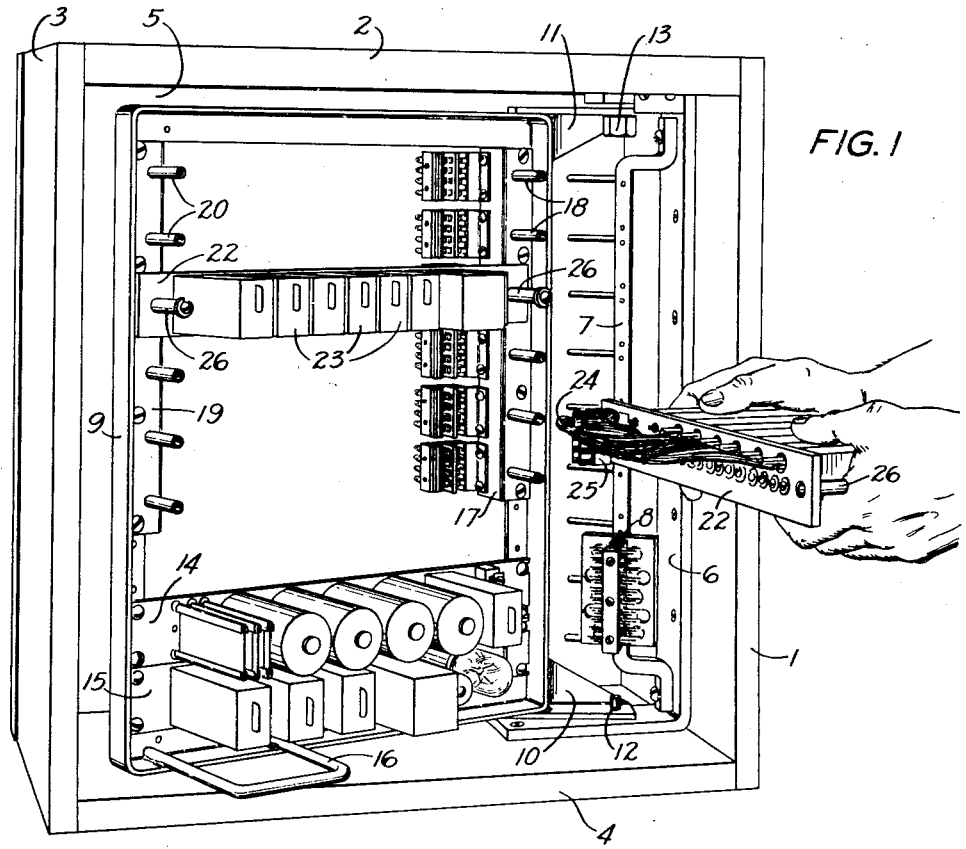
FIG. 1
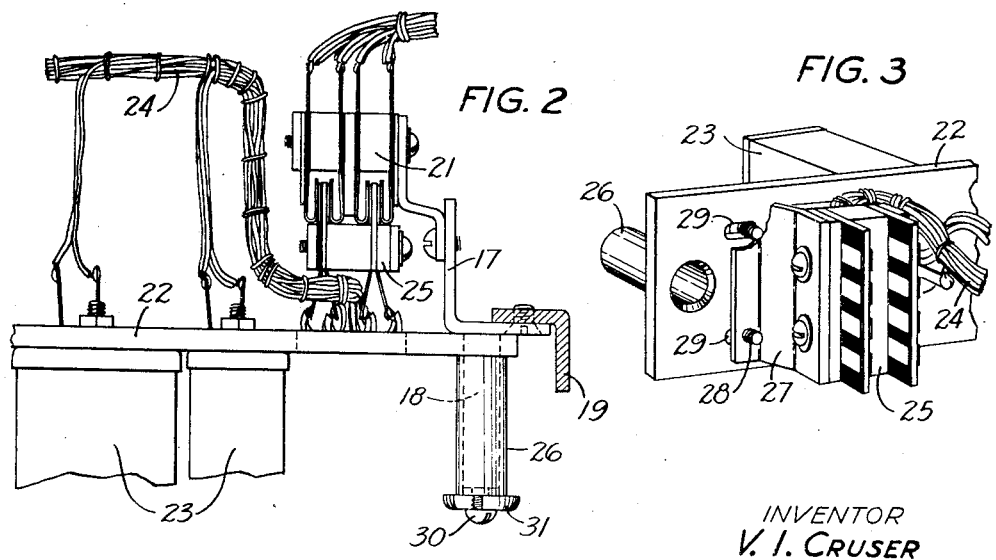
FIG. 2
FIG. 3
INVENTOR
V. I. CRUSER
BY
John Hall
ATTORNEY Patented June 9, 1931

1,809,025

UNITED STATES PATENT OFFICE

VICTOR I. CRUSER, OF EAST ORANGE, NEW JERSEY, ASSIGNOR TO BELL TELEPHONE LABORATORIES, INCORPORATED, OF NEW YORK, N. Y., A CORPORATION OF NEW YORK

ELECTRICAL DEVICE

Application filed July 29, 1929. Serial No. 381,996.

This invention relates to electrical devices and particularly to mounting arrangements for electrical apparatus.

The present invention is of particular use in telephone systems where subscribers employ a plurality of like arrangements as a plurality of line circuits. It is required that the apparatus on a subscriber's premises be neat, of good appearance, quickly installed, and easily maintained. Accordingly, it is proposed to install at such a point a framework capable of holding the maximum amount of apparatus which it is believed the subscriber can ultimately employ and to attach to this framework only such apparatus as is required to fill the subscriber's present needs. The framework is wired for its maximum capacity but only the particular number of electrical devices comprising the necessary electrical apparatus secured to a mounting plate and interconnected in a circuit terminating in a plug will be installed. Connection between the electrical devices and the framework wiring is made by means of jacks mounted on the framework and plugs individual to the devices. The arrangement of course may be reversed and the jack mounted on the mounting plate with the plug mounted on the frame.

In accordance with this invention the plug associated with each mounting plate is given a small range of movement with respect to the mounting plate. In one embodiment of the invention the plug is secured to the mounting plate through slotted screw holes and is only loosely secured to the mounting plate until after the device has been secured to the framework. In order to render the plug self-aligning, a guide member for each mounting plate is attached to the frame and a cooperating guide member is attached to each mounting plate so that when the mounting plate is being placed in position the plug will be accurately guided into its jack and then through its own limited freedom of movement will align itself properly.

The guide members may be used as a means to secure the mounting plate to the frame and thus perform a double function.

In the drawings Fig. 1 shows in perspective a complete subscriber's equipment box minus the cover giving a view of the framework on which is mounted at the bottom two rows of common apparatus, near the top one individual removable electrical device forming the particular subject matter of this invention and to the right another such device being placed in position. Fig. 2 is a plan view partly in section showing one end of the electrical device, the plug and jack arrangement, the guiding members and part of the framework. Fig. 3 is a perspective of one end of the electrical device illustrating the manner in which the plug is loosely secured to the mounting plate through slotted screw holes.

The four sides and the back of the box for housing the subscriber's equipment are designated 1, 2, 3, 4 and 5 respectively. A supporting member 6 is secured to sides 1, 2 and 4 and mounted on this is a cable support 7. At the bottom of the cable support is a terminal block 8 by means of which connections between the subscriber's equipment and the lines running out of the box are made. There is a square shaped frame 9 formed of angle iron to which are secured members 10 and 11 and through which the frame 9 is pivotally secured to the support 6. Pivot 12 is shown at the bottom and a cap screw 13 acting as a pivot is shown at the top.

At the bottom of frame 9 are shown two mounting plates 14 and 15 containing common apparatus. A stop member or bumper 16 is secured to frame 9 to prevent the door of the box (not shown) from striking any part of the apparatus.

On the right-hand upright portion of the frame 9 there is secured a member 17 to which a plurality of male guides 18 are secured. A similar member 19 carrying a plurality of male guides 20 is secured to the left-hand upright portion of frame 9. Corresponding in spacing to each pair of male guides 18 and 20, there is secured to member 17, a jack 21.

The electrical device consisting of a mounting plate 22, to which apparatus 23 is secured and wired by conductors 24 to a plug 25, may be placed in position and through the cooperation of the female guides 26, with the male guides 18 and 20 will go into position in such a manner that the plug 25 will be properly inserted into jack 21.

In Fig. 2, plug 25 is loosely secured to the mounting plate 22 through the conductors 24 alone. In Fig. 3 the plug 25 is secured to the mounting plate 22 by a member 27. Screws such as 28 for securing member 27 to mounting plate 22 are inserted through slotted holes 29 in the mounting plate and are not tightened until the mounting plate has been secured to the frame. Thus in each case the plug is self-aligning since it has a small freedom of movement.

A screw 30 and washer 31 are used to hold the male and female guide members together and secure the mounting plate to the frame.

What is claimed is:

1. An electrical device comprising electrical apparatus secured to a mounting plate and interconnected in a circuit terminating in a plug, said plug having a small range of movement with respect to said mounting plate.

2. An electrical device comprising electrical apparatus secured to a mounting plate and interconected in a circuit terminating in a plug, said plug having a small range of movement with respect to said mounting plate, and means for tightly securing said plug to said mounting plate.

3. An electrical device comprising electrical apparatus secured to a mounting plate and interconnected in a circuit terminating in a loosely secured self-aligning plug.

4. An electrical device comprising electrical apparatus secured to a mounting plate and interconnected in a circuit terminating in a loosely secured self-aligning plug, and means to guide said plug when said mounting plate is being positioned.

5. A frame adapted to hold a plurality of mounting plates, a corresponding plurality of jacks mounted on said frame, a corresponding plurality of guide members secured to said frame, and a plurality of like electrical devices each comprising electrical apparatus secured to a mounting plate and interconnected in a circuit terminating in a loosely secured self-aligning plug and a guide member secured to said mounting plate to cooperate with one of said frame guide members to guide said plug into said jack when said mounting plate is being placed in position on said frame.

6. A frame adapted to hold a plurality of mounting plates, a corresponding plurality of jacks mounted on said frame, a corresponding plurality of male guide members secured to said frame, and a plurality of like electrical devices each comprising electrical apparatus secured to a mounting plate and interconnected in a circuit terminating in a loosely secured self-aligning plug and a female guide member secured to said mounting plate to cooperate with one of said male guide members to guide said plug into said jack when said mounting plate is being placed in position on said frame.

7. A frame arranged to hold a plurality of mounting plates, a corresponding plurality of jacks mounted on said frame, a corresponding plurality of guide members secured to said frame, a plurality of like electrical devices each comprising electrical apparatus secured to a mounting plate and interconnected in a circuit terminating in a loosely secured self-aligning plug and a guide member secured to said mounting plate to cooperate with one of said frame guide members to guide said plug into said jack when said mounting plate is being placed in position on said frame, and means including said guide members for securing said mounting plates to said frame.

In witness whereof, I hereunto subscribe my name this 25th day of July, 1929.

VICTOR I. CRUSER.